Figure 1:
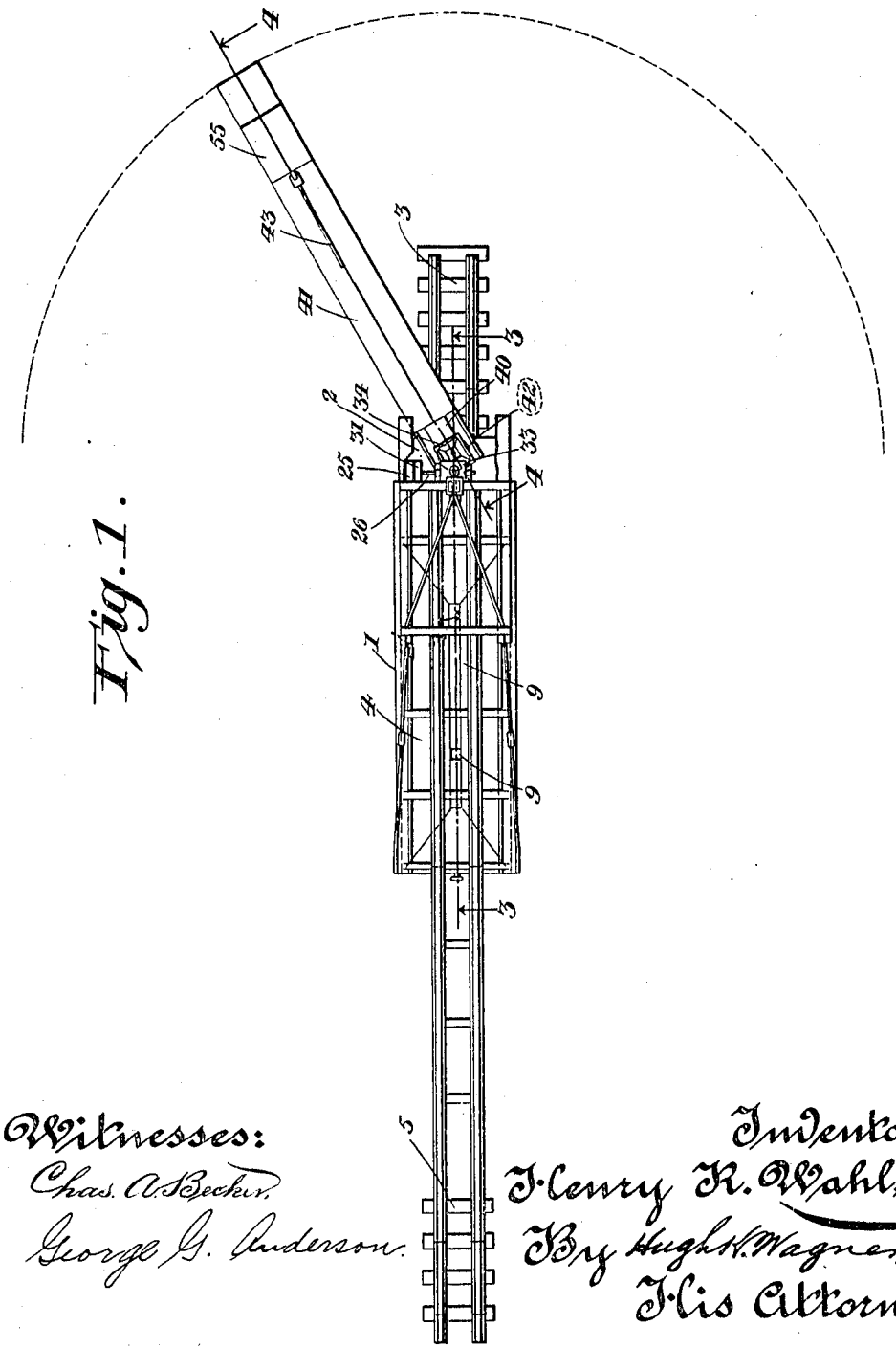

H. R. WAHL.
APPARATUS FOR DISPOSAL OF WASTE ROCK FROM CONCENTRATING MILLS.
APPLICATION FILED FEB. 28, 1910.

984,326.

Patented Feb. 14, 1911.
6 SHEETS—SHEET 1.

Witnesses:
Chas. A. Becker.
George G. Anderson.

Inventor:
Henry R. Wahl,
By Hugh K. Wagner
His Attorney

H. R. WAHL.
APPARATUS FOR DISPOSAL OF WASTE ROCK FROM CONCENTRATING MILLS.
APPLICATION FILED FEB. 28, 1910.
984,326.
Patented Feb. 14, 1911.
6 SHEETS—SHEET 2.
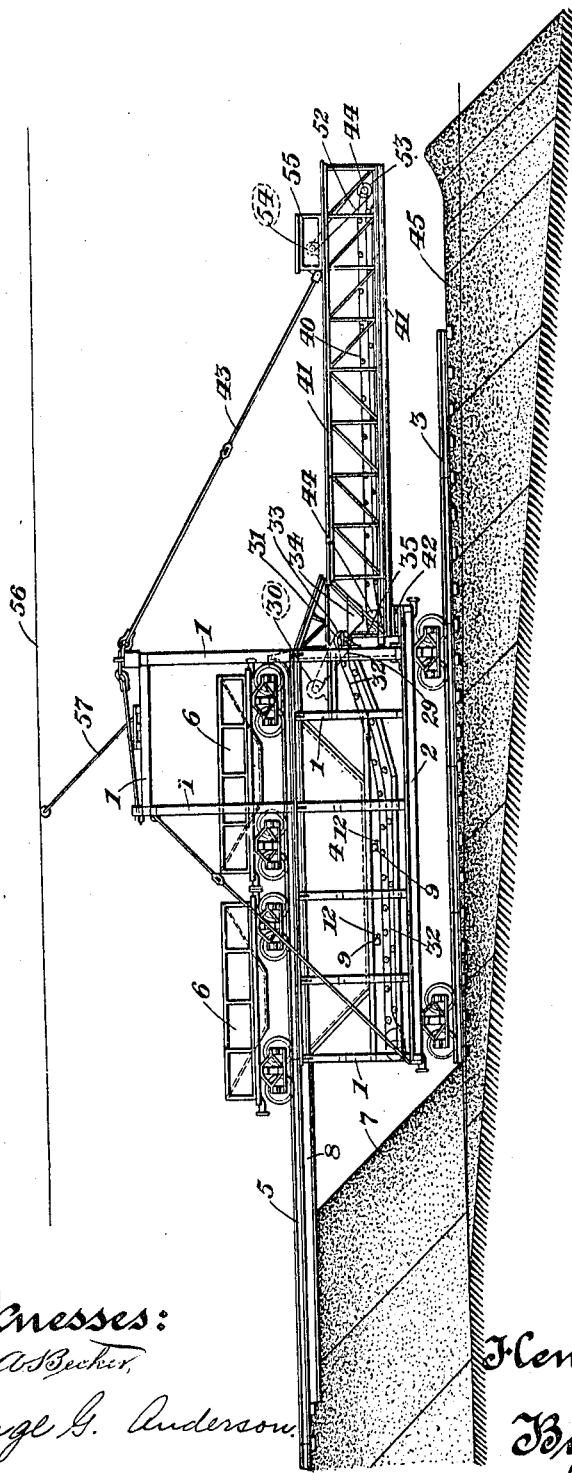

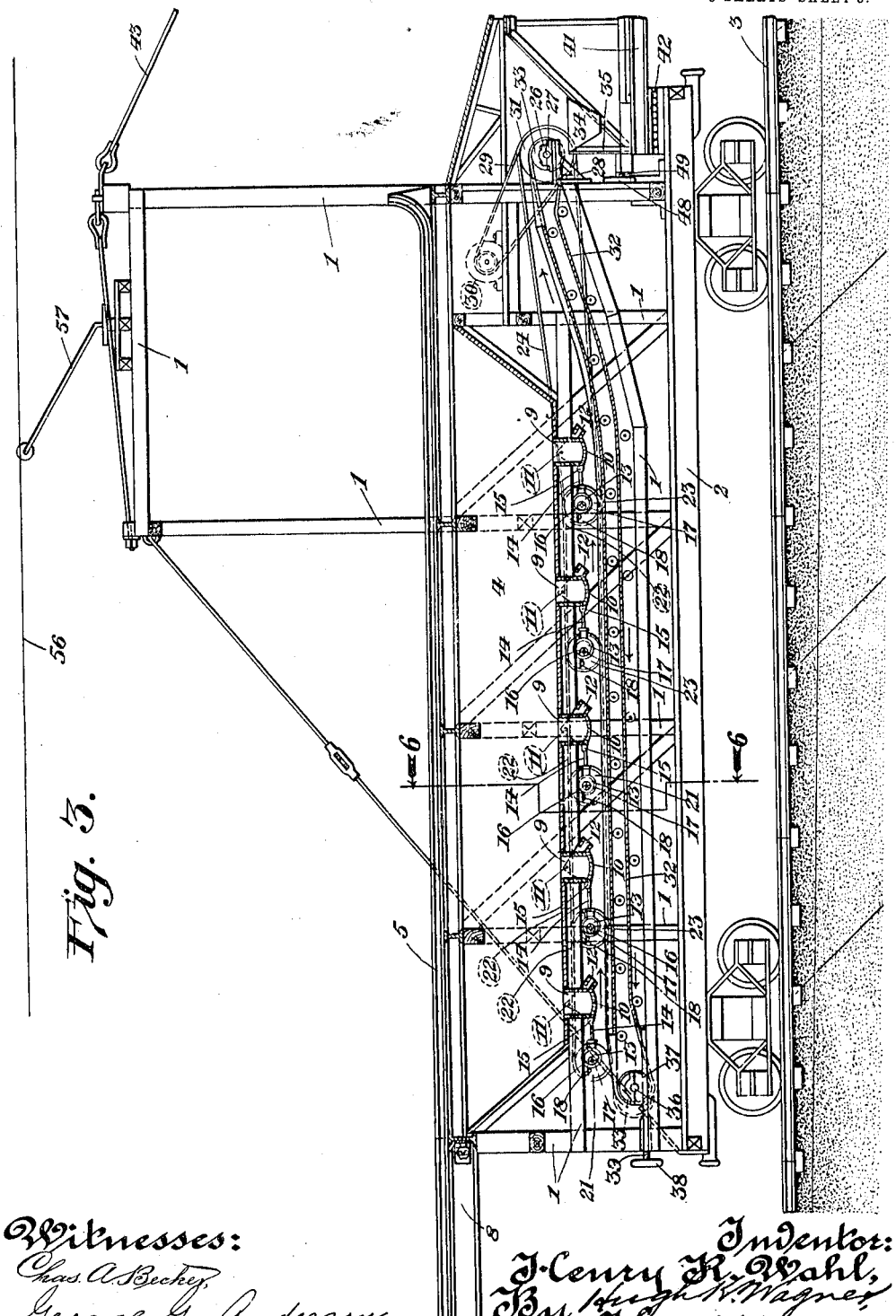

H. R. WAHL.
APPARATUS FOR DISPOSAL OF WASTE ROCK FROM CONCENTRATING MILLS.
APPLICATION FILED FEB. 28, 1910.
984,326.
Patented Feb. 14, 1911.
6 SHEETS—SHEET 4.
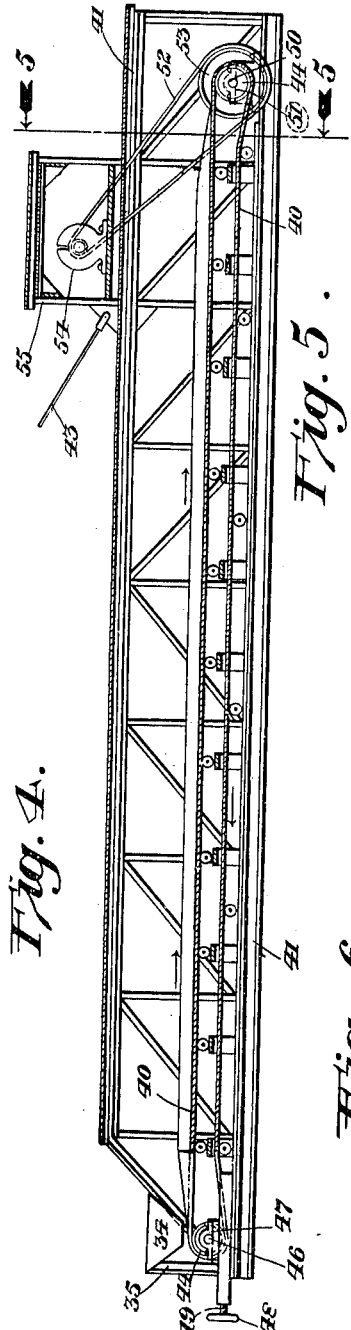
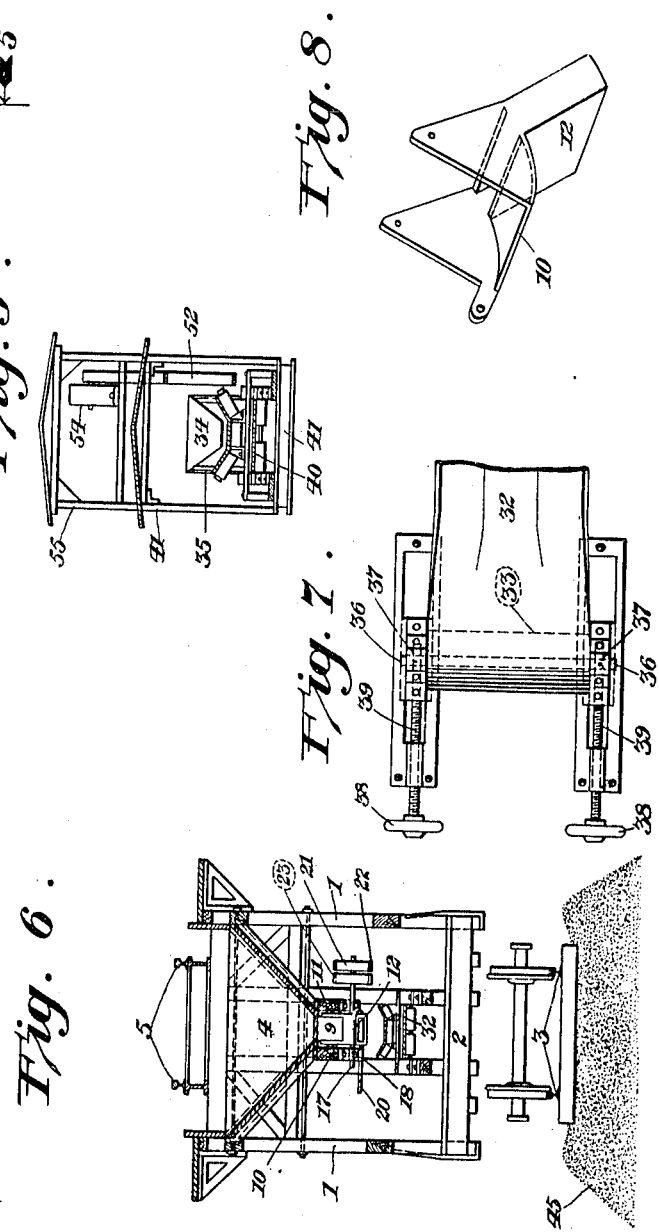
Witnesses:
Chas. A. Becker,
George G. Anderson
Inventor:
Henry R. Wahl,
By Hugh N. Wagner,
His Attorney.

H. R. WAHL.
APPARATUS FOR DISPOSAL OF WASTE ROCK FROM CONCENTRATING MILLS.
APPLICATION FILED FEB. 28, 1910.
984,326.
Patented Feb. 14, 1911.
6 SHEETS—SHEET 5.
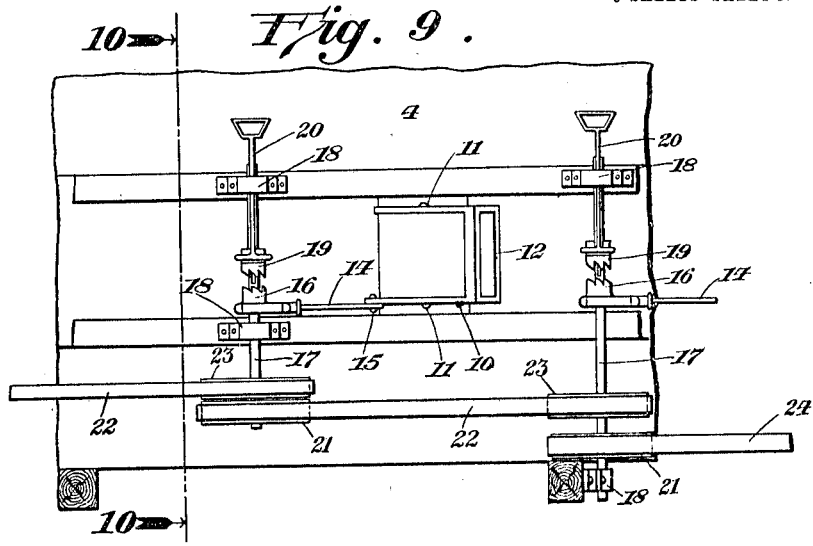

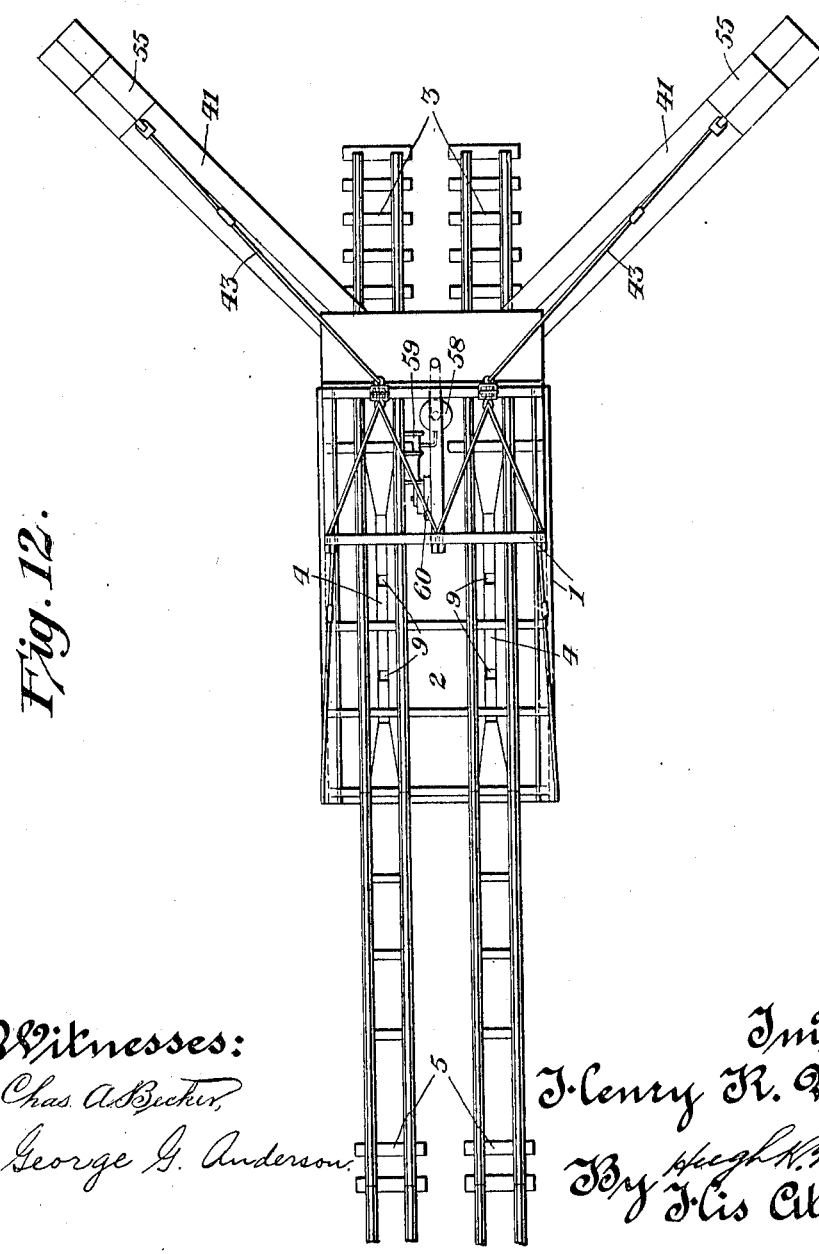

ced upon track 5 by means of an electric
UNITED STATES PATENT OFFICE.

HENRY R. WAHL, OF ELVINS, MISSOURI.

APPARATUS FOR DISPOSAL OF WASTE ROCK FROM CONCENTRATING-MILLS.

984,326.  Specification of Letters Patent.  Patented Feb. 14, 1911.

Application filed February 28, 1910. Serial No. 546,326.

*To all whom it may concern:*

Be it known that I, HENRY R. WAHL, a citizen of the United States, residing at the town of Elvins, in the county of St. Francois and State of Missouri, have invented certain new and useful Improvements in Apparatus for Disposal of Waste Rock from Concentrating-Mills, of which the following is a specification, reference being had therein to the accompanying drawings.

This invention relates to conveying and distributing apparatus, and more particularly to apparatus to be used in disposing of waste rock, or other material, from mines, concentrating mills for lead ore, or other places.

This invention consists in the provision of a movable hopper-car which supports a terminal of a track, upon which track cars are operated to deliver the material to said hopper-car and, also, to deposit the material behind said movable car, in order to make a roadbed for the track.

Another object of this invention is the provision of means for receiving the material and of means for distributing same either directly ahead of the apparatus or alongside thereof, in order to make a "fill" upon which a portable track is temporarily laid for the apparatus.

This invention, further, consists in certain novel features of construction and combination of parts, which will be hereinafter more fully described and pointed out in the claims.

In the drawings forming part of this specification, like numbers of reference denote like parts wherever they occur, and Figure 1 is a plan view of the complete apparatus; Fig. 2 is a side elevation of same; Fig. 3 is a sectional view on the line 3—3, Fig. 1; Fig. 4 is a sectional view on the line 4—4, Fig. 1; Fig. 5 is a sectional view on the line 5—5, Fig. 4; Fig. 6 is a sectional view on the line 6—6, Fig. 3; Fig. 7 is a plan view of means for regulating the tension of one of the conveyers; Fig. 8 is a perspective view of a valve for one of the discharge pipes; Fig. 9 is a bottom plan view of one of the discharge pipes; Fig. 10 is a sectional view on the line 10—10, Fig. 9; Fig. 11 is a sectional view on the line 11—11, Fig. 10; and Fig. 12 is a plan view of an alternate form of the apparatus.

The framework 1 of a car 2, which is movable upon a comparatively short track 3, supports a bin 4 and, also, the terminal of a track 5, which is located above said bin and which extends to the concentrating mill, mine, or other place where the material to be disposed of is located. Cars 6, preferably of the bottom-discharge type, are operated upon track 5 by means of an electric or steam locomotive (not shown in the drawings) or by any other suitable means. Car 2 is preferably made long enough to allow two or more cars 6 at a time to occupy a position above bin 4, in order to discharge their contents into same, but, when it is desirable, said car 2 can be made of such length that only one car 6 can occupy a position above said bin.

The track 5 is laid upon a "fill" 7, which terminates at the rear end of track 3. A portion of track 5 spans the open space between the end of "fill" 7 and the rear end of car 2 and is supported by means of a pair of girders 8. Each girder 8 is hinged in any suitable manner to the end of car 2, in order to allow the end of same that rests on the "fill" to move up or down relative to car 2 when said car is moved forwardly in the manner hereinafter described.

A plurality of discharge pipes 9 project from bin 4. Each of said pipes is provided with a valve 10 which is pivoted at 11 to said pipe and which bears a spout 12, and, when said valve is moved to a position to cause spout 12 to communicate with pipe 9, the material in said pipe passes out through said spout 12. Said valve is connected to an eccentric 13 by means of an arm 14 pivoted at 15 to said valve. Said eccentric 13 bears a clutch member 16, and is loosely mounted on a shaft 17, journaled in journal-boxes 18. A clutch 19 is splined to shaft 17 and is adapted to slide thereon, a lever 20 being arranged to move said clutch into and out of engagement with clutch member 16, in order to cause eccentric 13 to move valve 10 to a position to open or close pipe 9.

Each shaft 17 is provided with a pulley 21. A belt 22 drives pulley 21 and is driven by a pulley 23 on the next shaft 17. A belt 24 drives one of the pulleys 21, and receives its power from a pulley 25 on a shaft 26 journaled in journal-boxes 27, which are supported by means of brackets 28 or the like. A belt 29 receives its power from a motor 30 or other suitable source and drives a pulley 31 on said shaft 26.

A belt conveyer 32, preferably of the

Robins type, is arranged to receive the material discharged from spouts 12. Said conveyer runs on a pair of pulleys 33, and travels in the direction indicated by the arrows in Fig. 3, in order to cause the material carried thereby to be discharged into a hopper 34 supported by standards 35 or the like at the forward end of car 2. One of the pulleys 33 is mounted on shaft 26, and drives the conveyer 32. The other one of said pulleys 33 is mounted on a shaft 36, which is journaled in journal-boxes 37, each of said journal-boxes being arranged to be adjusted by means of a hand-wheel 38 on a screw-threaded rod 39 or other suitable device attached thereto for the purpose of regulating the tension of the belt conveyer 32.

A belt conveyer 40, also of the Robins type, is arranged to receive the material discharged from hopper 34, and is mounted upon a boom 41. Said boom is supported on a roller-bearing turn-table 42 on the front end of car 2, and is free to swing in a plane more or less horizontal to the horizon through substantially one hundred and eighty degrees, the free end of said boom being supported by means of a guy 43 which is fastened to an upright of the framework 1. Said conveyer 40 runs on a pair of pulleys 44 and travels in the direction indicated by the arrows in Fig. 4 to cause the material carried thereby to be discharged at the forward end of boom 41, in order to make the "fill" 45 upon which the track 3 is laid. One of the pulleys 44 is mounted on a shaft 46, which is journaled in journal-boxes 47, each of said journal-boxes 47 being arranged to be adjusted by means of a hand-wheel 48 on a screw-threaded rod 49, or other suitable device, for the purpose of regulating the tension of belt conveyer 40. The other one of said pulleys 44 is mounted on a shaft 50 journaled in journal-boxes 51, and drives said conveyer 40. A belt 52 drives pulley 53 on said shaft 50, and receives its power from a motor 54 or other suitable driving means, preferably located in a cage 55 borne by boom 41.

When an electric locomotive is used for the purpose of operating cars 6 upon track 5, a trolley wire 56 is strung in the usual manner over said track. A trolley pole 57 borne by framework 1 of car 2 is arranged to engage trolley wire 56 in order to supply motive power to the motors 30 and 54 for the operation of conveyers 32 and 40.

In the alternate form depicted in Fig. 12, the car 2 is made sufficiently wide to extend over two parallel tracks 3 and is supported thereby. The bin 4, track 5, conveyers 32 and 40, and boom 41 are in duplicate and are arranged in the manner hereinabove described. A central power station is preferably located on said car 2, and consists of a boiler 58 and engine 59, which operates a dynamo 60, from which electrical motive power is obtained and conducted to the motors for operating the various moving parts.

The apparatus is best adapted to operate over sloping ground or over a valley, the commencement of operation being at as high a location as possible. As long as the difference in elevation between the grade of "fill" 7 and the grade of the natural ground upon which said "fill" is made is substantially equal to the difference in elevation between the grade of track 5 and the grade of track 3, said track 3 is laid upon the natural ground. After these preliminaries, the apparatus is used as follows: Each car 6 is brought to a position over girders 8 to cause the contents thereof to be dumped between said girders and to be deposited upon the end of "fill" 7. The material is deposited in this manner upon the end of "fill" 7 until same reaches the rear end of track 3. The rail joint at the end of each girder 8 that rests upon the "fill" 7 is broken and the car 2 is moved forwardly in any suitable manner upon track 3 until same clears the last rail joints of said track 3. Two rails are laid in the space that is made in track 5, when the car 2 is moved forwardly upon track 3, and are connected in the usual manner to the adjoining rails of said track 5. The rear section of track 3 is removed and is laid as the forward section of said track. The material is then deposited upon the end of "fill" 7 until same reaches the rear end of track 3, and the car 2 is again moved forwardly as hereinabove described. The car 2 is thus moved forwardly until the forward end of boom 41 reaches over the point where the natural ground upon which "fill" 7 is made slopes downwardly from the grade of track 3. The material is then dumped into bin 4, and the conveyers 32 and 40 are set into operation, and the valves 10 are moved in the manner hereinabove described to cause the material to pass through spouts 12 to said conveyer 32. Said conveyer 32 deposits the material carried thereby into hopper 34, which delivers same to the conveyer 40. Said conveyer 40 delivers the material from the forward end of boom 41, which is swung in any suitable manner into position to carry the material to the point desired, and there to dump it. When the material thus deposited reaches the grade of track 3, the car 2 is moved a few feet ahead, and the operation is repeated. After each forward movement of car 2 upon track 3, the boom 41 deposits the material to the extent of its distributing area in order to build the "fill" or roadbed 45 for track 3. When car 2 is moved forwardy far enough to clear the last rail joints of said track 3, the rear section of said track is moved to the front end, and the "fill" 7 is lengthened in the manner hereinabove described.

Once started, this apparatus makes its own roadbed without the necessity of using trestles o false-work, and is capable of filling up almost an entire valley by returning to the original starting point and offsetting the car 2 and track 3 the width of the "fill" 7.

The operation of the alternate form of the apparatus is substantially the same as the operation of the form just described, with the exception that the moving parts are driven with motive power generated by a central power station located on said car. Due to the duplication of parts in this form, the apparatus can distribute double the amount of material and over a greater area than is possible with the form of apparatus first described.

I claim:

1. In an apparatus of the character described, the combination of a movable car, a main track having a terminal supported thereby, a roadbed for said track, a bin borne by said car and arranged beneath the terminal of said track, loading cars operated upon said track and adapted to deposit the material into said bin and, also, upon the end of said roadbed behind said movable car, a conveyer arranged to receive the material discharged from said bin, a swinging boom on the forward end of said movable car, and a conveyer borne by said boom and arranged to receive the material discharged from said first-mentioned conveyer.

2. In an apparatus of the character described, the combination of a movable car, a main track having a terminal supported thereby, a roadbed for said track, a bin borne by said car and arranged beneath the terminal of said track, loading cars operated upon said track and adapted to deposit the material into said bin and, also, upon the end of said roadbed behind said movable car, a conveyer arranged to receive the material discharged from said bin, a swinging boom on the forward end of said movable car, a conveyer borne by said boom and arranged to receive the material discharged from said first-mentioned conveyer, and an auxiliary track for said movable car, said auxiliary track consisting of portable sections, the conveyer on said boom being adapted to deposit the material laterally of and ahead of said movable car.

3. In an apparatus of the character described, the combination of a movable car, a track whereon said car is adapted to travel, a roadbed for said track, an elevated track having its terminal supported upon said car, a bin borne by said car and arranged beneath said terminal, loading cars operable upon the second-named track and adapted to deposit material into said bin and also upon the end of said road-bed behind said movable car, a conveyer arranged to receive the material discharged from said bin, and a distributing conveyer adapted to receive the material from the first-named conveyer.

In testimony whereof I have affixed my signature in presence of two witnesses.

HENRY R. WAHL.

Witnesses:
G. A. PRICER,
F. REICHERT.